L. V. HUE & C. ROZIÈRE.
METHOD OF MOLDING DESIGNS.
No. 77,042. Patented Apr. 21, 1868.
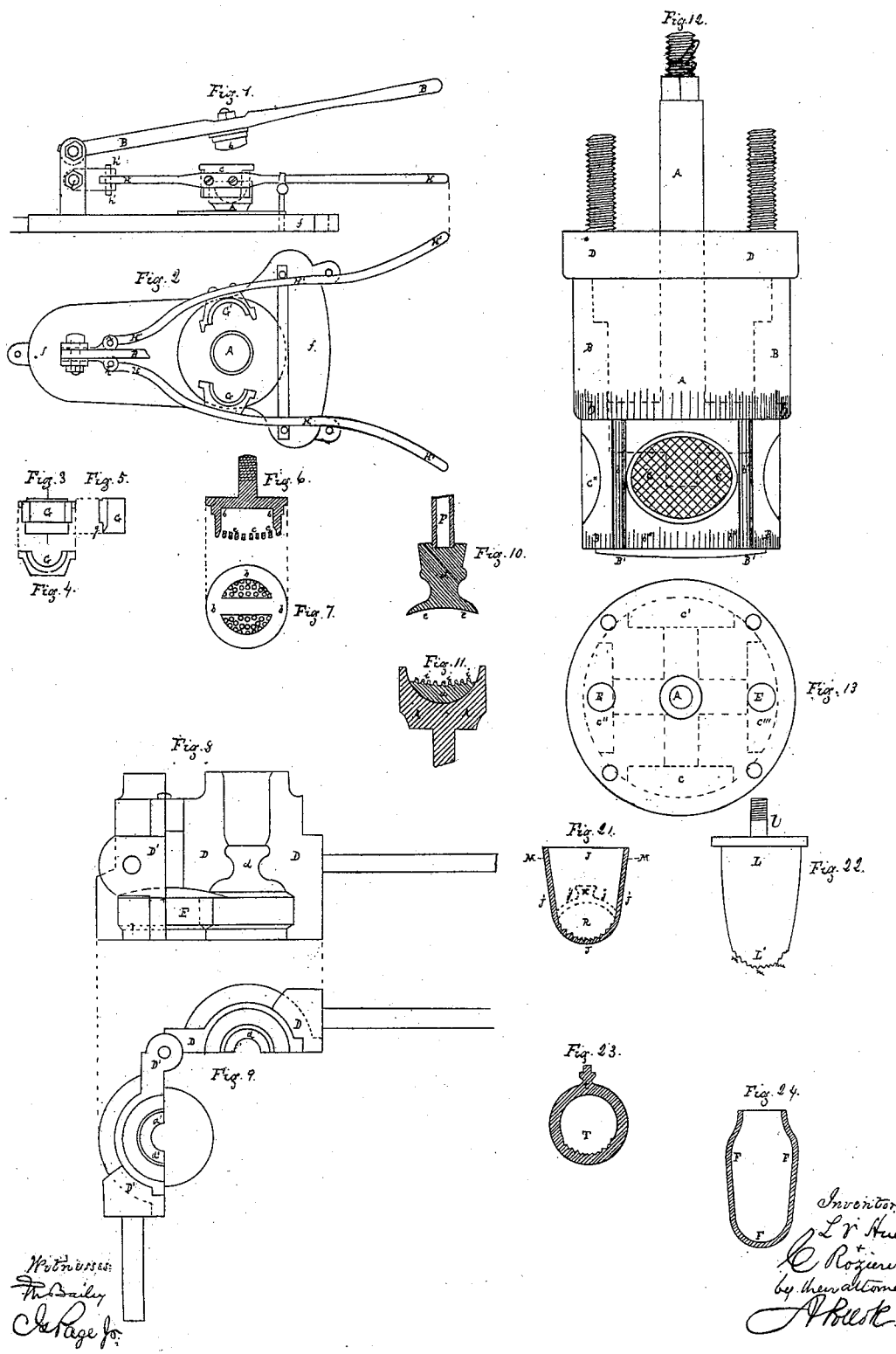

L. V. HUE & C. ROZIÈRE.
METHOD OF MOLDING DESIGNS.

No. 77,042. Patented Apr. 21, 1868.

United States Patent Office.

LÉON V. HUE AND CHARLES ROZIÈRE, OF PARIS, FRANCE.

Letters Patent No. 77,042, dated April 21, 1868.

IMPROVED METHOD OF MOULDING DESIGNS.

The Schedule referred to in these Letters Patent and making part of the same.

TO ALL WHOM IT MAY CONCERN:

Be it known that we, LÉON VICTOR HUE, machine-maker, and CHARLES ROZIÈRE, chemist, both of 36 Rue de Malte, Paris, in the Empire of France, have invented certain new and useful Improvements in the Method of and Means for Moulding Subjects or Designs in Glass or Crystal, for ornamenting them inwardly; and we do hereby declare that the following is a full, clear, and exact description thereof, reference being had to the accompanying drawings.

Our invention consists in the method of producing internally-ornamented or decorated articles of glass, by pressing, blowing, or doubling them in moulds, as hereinafter described. The ornaments or designs are printed on the glass, when almost fused, with engraved punches or stamps, and are afterwards covered with other pieces of glass, welded or fused or otherwise united with the ornamented pieces. The ornamental designs are thus enclosed within the mass of glass, for which reason we call them "internal decorations."

In order to effect our object, we use stamps or punches, suitably chased or engraved, either in relief or the reverse, which are pressed upon the nearly molten glass held within any suitable mould. We then immediately cover the impressions or prints thus formed with other pieces of glass, also highly heated, and so prepared that they weld or unite by their edges only with the piece or pieces just ornamented.

We are thus enabled to produce knobs, handles, and other articles, which, while perfectly smooth on their exterior, are internally ornamented or engraved. The designs may, of course, be varied at will, inasmuch as the stamps may be engraved with any desired inscription, emblem, or portrait. The softened glass may also be impressed, by means of suitable punches or stamps, with filagrees of gold, silver, or colored enamels, which, as already set forth, should be afterwards covered with glass.

In certain cases, in order to ornament decanters, smelling-bottles, drinking-glasses, and similar articles, we have found it desirable to construct a box with mechanical stamps or punches, which may be united and set in motion all together by combinations of screws, levers, eccentrics, and suitable means. This box is introduced into the centre of a mould containing glass almost in a state of fusion. The glass flows around the said box, and, by means of a key, all the stamps are driven out, and imprint themselves in the said glass. The stamps are then immediately retracted, and the box removed, and a piece of glass, hollow, and ornamented on its inner surface, is thus produced.

By introducing into this piece a glass cylinder, ("*manchon,*") blown and prepared in another mould, and welding these two parts by their edges, we have a piece of hollow glass, lined or doubled, and ornamented, which the workman softens at the fire, and shapes to make either a decanter or smelling-bottle, or any kind of vase.

To complete the description of our invention, we will now give an explanatory statement of the drawings annexed.

Figures 1 and 2 represent (one-quarter size) a press serving for the manufacture of knobs or handles for doors or locks.

Figures 3, 4, and 5 are the details of the jaws, which serve to weld or solder the two pieces of glass of which the knob is composed.

Figures 6 and 7 represent (half size) the stamp with which the knob is ornamented.

Figures 8 and 9 represent (half size) the mould with which the lap or covering of the knob is prepared.

Figure 10 is a section of this doubling lap or covering.

Figure 11 is a section of the matrix in which the above-mentioned knob is moulded.

In all figures similar letters indicate similar parts.

A, matrix in which glass is placed almost in fusion to form the part $a$ of the knob or handle.

B, lever of the press, carrying the engraved stamp $b$. It is by bringing down this stamp into the matrix A, and pressing it on the glass which it contains, that the part $a$, shown in fig. 11, is formed. This piece is concave at its ornamented part, because the stamp $b$ is convex. This cavity prevents injury to the projecting parts $i\ i\ i$ of the ornamentations when the two parts of the knob are brought together.

The other part, d, of this knob or handle is shaped between the jaws D and D' of the mould, figs. 8 and 9. It is also concave at e e, as may be seen at fig. 10.

The piece of glass, a, which remains in the matrix, being highly heated, the other piece, d, also heated, is placed on top of it. For this purpose it is stuck on the end of a glass-blower's pipe, F. The levers H H' are then grasped at their end, and, by bringing them together, the jaws G and G' enter the matrix A, and bear on the edge of the piece d, which welds or unites with the piece a. The knob is therefore made, and the ornamentation i i i has remained intact, because, the parts a and d being concave, they only touch and weld by their edges.

Baluster-knobs, pateras, paper-weights, and analogous articles, will be manufactured in the same manner.

A knob or handle like the preceding may also be manufactured with a blown cylinder, ("manchon,") as shown in Figures 21, 22, and 23.

J is a glass cylinder, blown in a mould, and ornamented interiorly. The blowing of this cylinder is a well-known process, but that which is not known is the method of its internal ornamentation. The stamp L is placed on the head of the press, or on a lever, and by lowering it into the cylinder J when it is in its mould, and very hot, the engraved part L' of this stamp imprints itself in the glass. Then the glass-worker cuts the cylinder at the requisite height, at M, for example, and bending down the edges, as shown at J'', he welds them, and with a piece forms the neck K. Thus the knob R, shown in dotted lines, fig. 21, is hollow, ornamented in its interior, and becomes, by blowing, the knob of a baluster, like that shown in fig. 23. A patera or similar article would be made in like manner.

Figures 12 and 13 represent a box with mechanical stamps.

Figure 14:
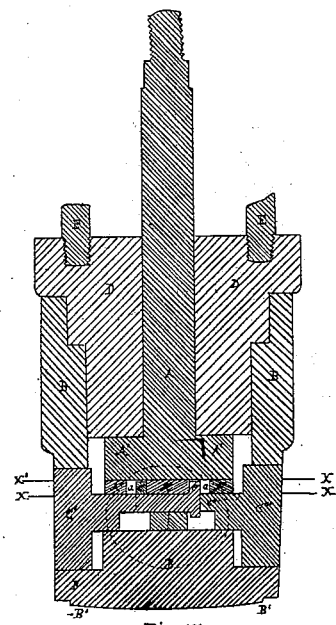

Figure 14 is a vertical section of it through its axis.

Figure 15:
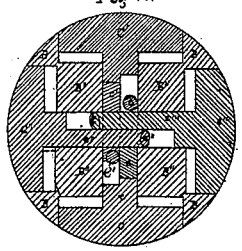

Figure 15 is a horizontal section at x x; and

Figure 16:
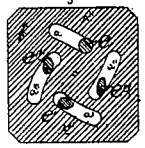
Figure 25:
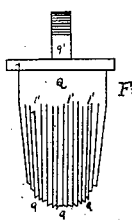

Figure 16 is a section at x' x', at the foot of the working-rod of the stamps.

c c' c'' c''' are four stamps, engraved on their faces. Each of these stamps terminates in a tail-piece, e e' e'' e''', the end of which turns up and forms a catch, which belongs in one of the grooves or slots a a' a'' a''' of the foot A'' of the working-rod A. B is a cast-iron box, in which the stamps are lodged. The nipple or cap D presses on the foot A' of the rod A, and acts as guide and support to this rod.

All being arranged as shown in the drawing, it is evident that if the rod A be turned in the direction indicated by the arrow, (fig. 16,) the four stamps immediately come out of the box, and that to retract them, it is only necessary to turn the rod in the contrary direction.

It will be understood that the box may carry more or less than four stamps. Grooves or flutings may also be made in it, as those b b' b'', and the bottom, B', may also be engraved. There are further means of ornamenting the glass.

We will now describe the operation of this box, taking the manufacture of a decanter for example. The said box is set on the head of a press, above a matrix, into which is carried a certain quantity of glass almost in a state of fusion, and the box B is immediately brought down into this glass, which overflows and moulds itself around the box. The stamps are then made to come out by turning the rod A, and, after having impressed themselves in the glass, are retracted within the box, which is then withdrawn. In the piece of glass thus prepared is placed a cylinder or jacket ("manchon") of white or colored glass, (for example, like that, P, fig. 24,) so shaped as to fit exactly in this piece. They are then welded or fastened together by their edges. We have thus a hollow piece of glass internally ornamented, which the glass-maker softens at the fire to make the decanter.

This lining, with an interior jacket or envelope, ("manchon,") is a process well known to glass-blowers, but has never been used to manufacture articles ornamented in the manner herein described.

Smelling-bottles, drinking-glasses, and all kinds of vases, may be thus made.

Figure 26 represents a stamp or punch, Q, engraved at its base, and fluted around its periphery at q r q r q r. On lowering this stamp into a cylinder of glass, heated to a high temperature, it is ornamented in its interior, and by lengthening or drawing out this cylinder, ("manchon,") which glass-blowers call glass-spinning, tubes will be obtained, ornamented interiorly, but smooth on the outside, and which may be used in the decoration of apartments.

Figure 18:
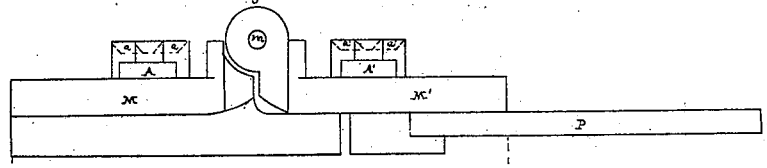
Figure 17:
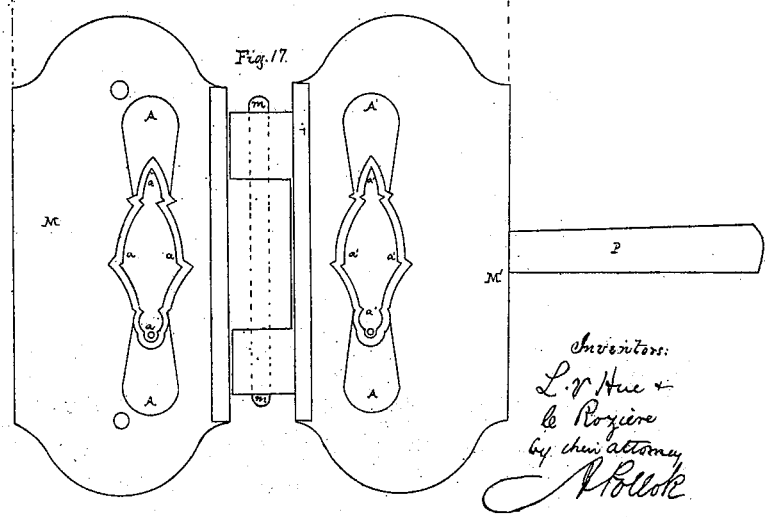

Figures 17 and 18 represent a mould for making lustre-plates "or flat drops, technically termed fiddle-drops," also internally ornamented.

Figure 19:
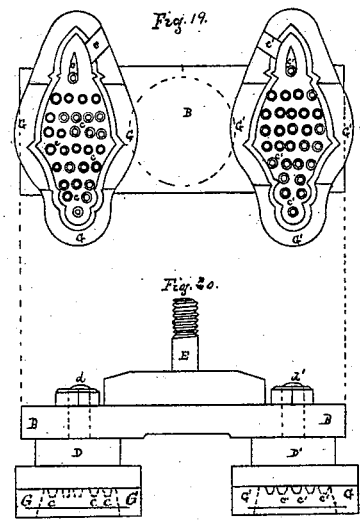
Figure 20:
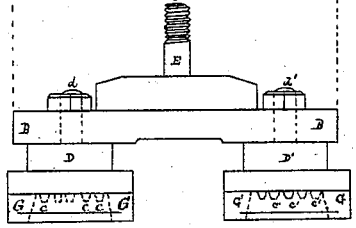

Figures 19 and 20 represent a mould engraved for making this ornamentation.

M and M' are the two parts of the mould, united by a strong hinge, m. Each carries a hollow matrix, A A', in which half a plate is moulded. For this purpose hot glass is placed in each matrix, the engraved stamps D D' are then brought down on to them, and are imprinted in the glass. The stamps or punches are then immediately withdrawn, and the mould is closed, when the two half plates come, the one on the other, and weld or fuse together edge to edge, because they are slightly concave. A plate is thus obtained made in two parts, ornamented in the thickness of the glass, and smooth on the exterior.

Such are the most striking applications of our invention.

What we claim, and desire to secure by Letters Patent of the United States, is—

The method of forming or impressing internal ornamentations or designs in glass-ware or crystal, in the manner herein shown and specified.

L. V. HUE,
CH. ROZIÈRE.

Witnesses:
 A. POLLOK,
 BRESSON.